Nov. 25, 1952  H. N. CHAIT  2,619,635
ARBITRARILY POLARIZED ANTENNA SYSTEM
Filed June 19, 1950  3 Sheets-Sheet 1
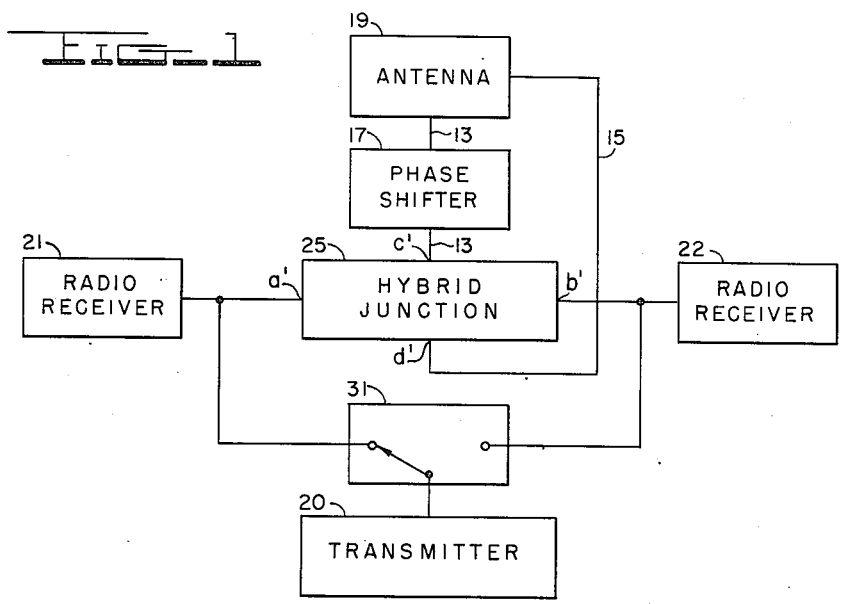
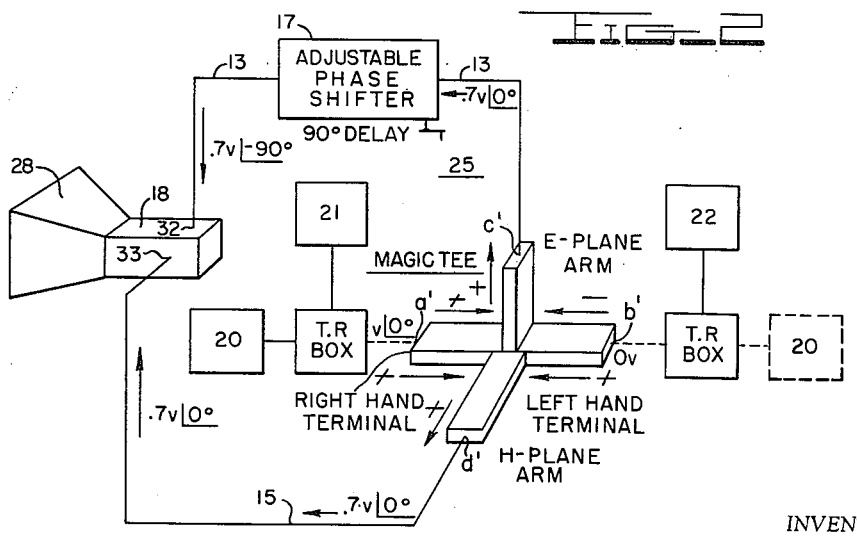
INVENTOR
HERMAN N. CHAIT
BY  *D. E. Snyder*
    *Howard White*  ATTORNEYS Nov. 25, 1952  H. N. CHAIT  2,619,635
ARBITRARILY POLARIZED ANTENNA SYSTEM
Filed June 19, 1950  3 Sheets-Sheet 2
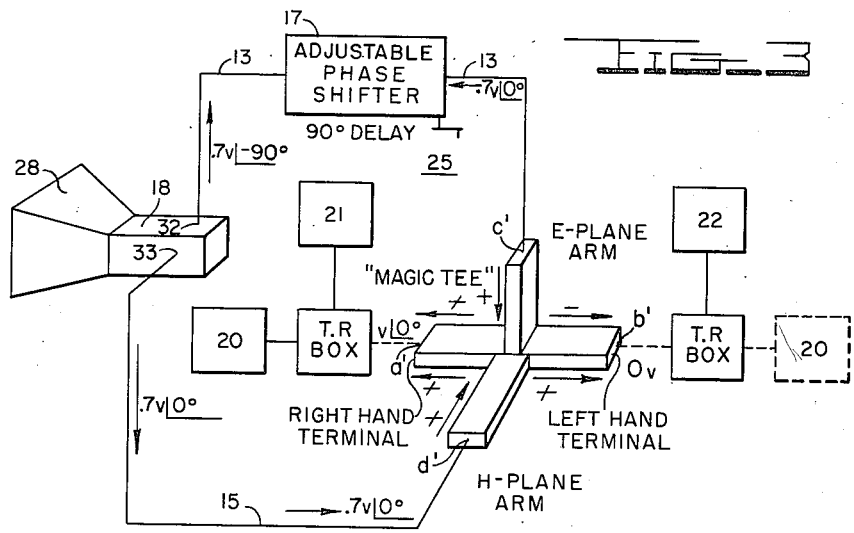
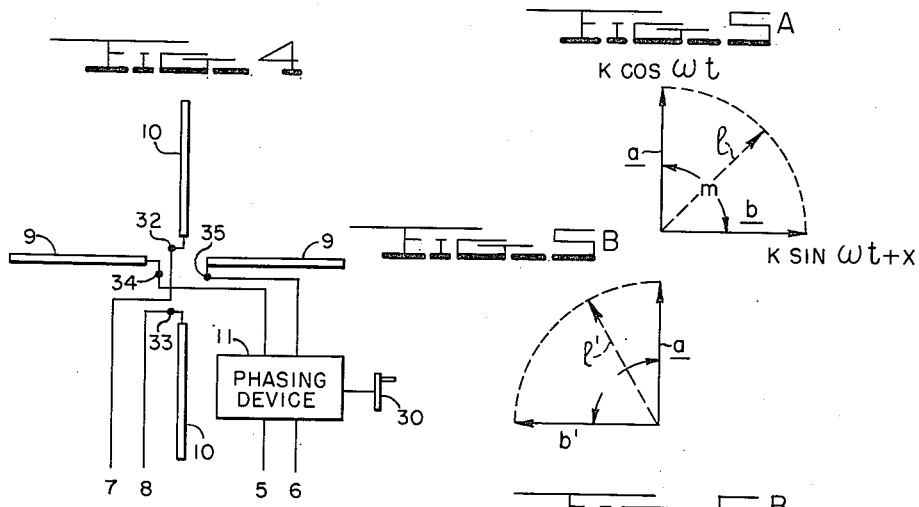
INVENTOR
HERMAN N. CHAIT
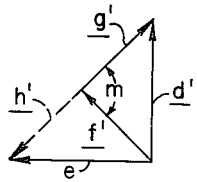
ATTORNEYS Nov. 25, 1952 H. N. CHAIT 2,619,635
ARBITRARILY POLARIZED ANTENNA SYSTEM
Filed June 19, 1950 3 Sheets-Sheet 3
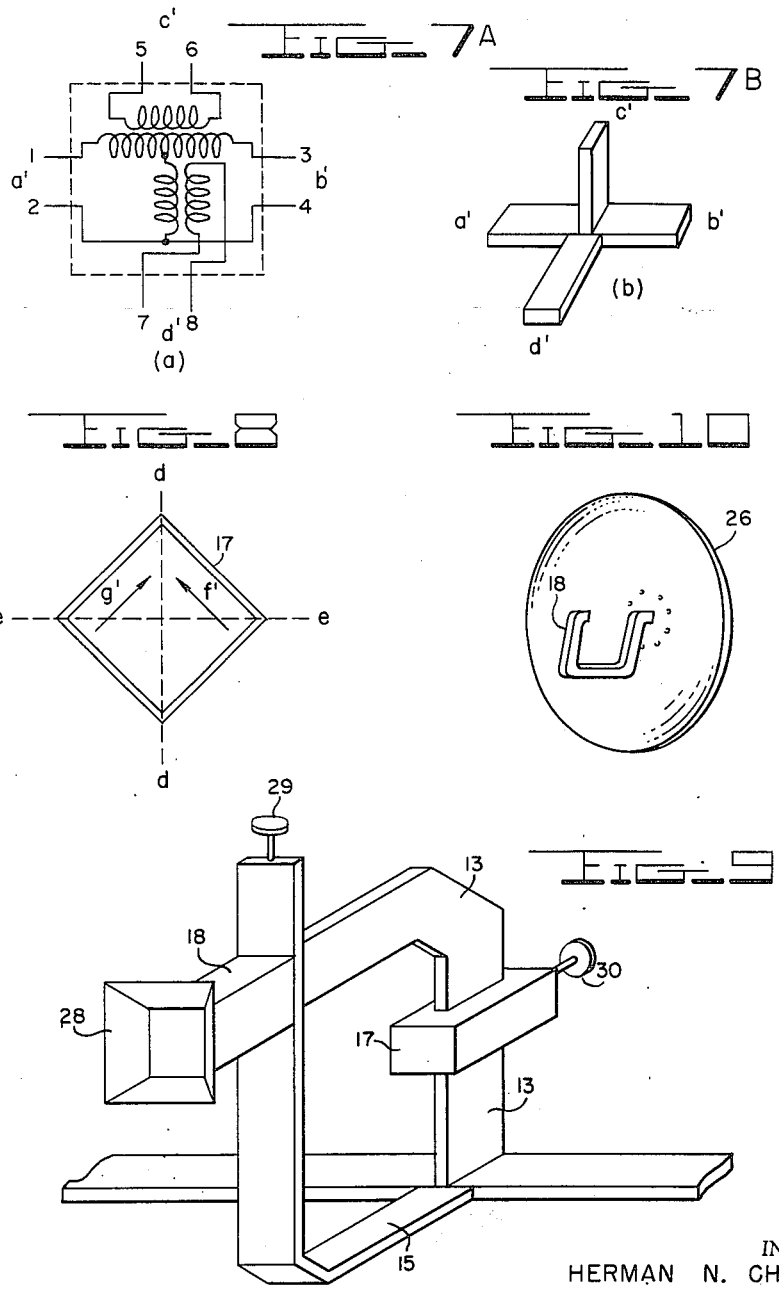
INVENTOR
HERMAN N. CHAIT
BY
ATTORNEYS Patented Nov. 25, 1952

UNITED STATES PATENT OFFICE 2,619,635

ARBITRARILY POLARIZED ANTENNA SYSTEM

Herman N. Chait, Washington, D. C.

Application June 19, 1950, Serial No. 169,060

14 Claims. (Cl. 343—100)

(Granted under the act of March 3, 1883, as amended April 30, 1928; 370 O. G. 757)

This invention relates to apparatus for propagating and receiving electromagnetic waves having various types of polarization.

More specifically this invention relates to apparatus for propagating electromagnetic waves having one type of polarization characteristic and receiving waves having either or both the transmitted polarization and its cross-polarized component.

A greater knowledge of the polarization characteristics of reflected radio waves can have important effects on the design of future communication and radar systems. For the purpose of studying these characteristics it is necessary to be able to discriminate between various types of electromagnetic polarization. An obvious expedient would be to have separate propagating and receiving apparatus for each type of polarization to be studied. This invention relates to apparatus which will greatly simplify the apparatus required for this purpose.

A problem exists in high power radar apparatus of isolating the receiver from the transmitter. The present invention permits almost perfect isolation without any loss or waste of power.

One object of this invention is therefore to provide a relatively simple apparatus for receiving and discriminating between various types of electromagnetic polarization and their cross-polarized component.

Another object of this invention is to provide relatively simple apparatus for propagating electromagnetic waves having one type of polarization and receiving both the transmitted polarization and its cross-polarized component separately and simultaneously.

Another object of this invention is to provide a relatively simple apparatus for receiving and discriminating between linear polarization, circular, and elliptical polarization of one type from their cross-polarized component.

Another object of the invention is to provide a relatively simple apparatus for propagating electromagnetic waves having either linear, circular, or elliptical polarization of any sense and receiving both the transmitted polarization and its cross-polarized component separately and simultaneously.

Still another object of the invention is to provide a means for isolating the receiver from the transmitter without any waste of power.

In the drawings:

Fig. 1 is a block diagram showing the relationship between the various elements which make up the invention.

Fig. 2 is a diagrammatic representation showing one embodiment of the invention and its operation used in the propagation of right hand circular polarization.

Fig. 3 shows a diagrammatical representation of the operation of the embodiment of Fig. 2 during reception of right-hand circular polarization.

Fig. 4 shows another embodiment of the invention using more conventional antenna elements.

Figs. 5a and 5b represent a pair of vector diagrams useful for explaining how circular and elliptical polarization is obtained by the present invention.

Figs. 6a and 6b represent a pair of vector diagrams useful for explaining how linear polarization is obtained.

Figs. 7a and 7b are diagrams showing various kinds of hybrid junctions.

Fig. 8 is a cross-sectional view of the square wave guide adjacent the horn of the embodiment of Fig. 2 when it is oriented so as to receive linear polarization.

Fig. 9 is a perspective view of a portion of the embodiment of Fig. 2.

Fig. 10 shows modification of the preferred embodiment when a reflector is used in conjunction with the radiating horn.

In the several figures of the drawing, similar reference characters have been used throughout to designate corresponding parts of various embodiments.

There are three basic types of electric field polarization. These are linear, circular, and elliptical polarization. In linear polarization the electric field does not rotate as it does with circular and elliptical polarization. Circular polarization occurs when the electric field rotates in space but keeps a constant magnitude. In elliptical polarization the vector rotates and also changes in magnitude; the locus of points of the end of a vector representing this latter type of electric field polarization ellipse.

The "cross-polarized component" of a linear, horizontal, electric field polarization (i. e. electric field extending horizontally) is a linear vertical electric field polarization; an electric field rotating clockwise with a constant magnitude is the "cross-polarized component" of an electric field rotating counter-clockwise at constant magnitude; likewise, an electric field rotating clockwise wherein the locus of a vector representing it follows an ellipse whose major axis is in a first given direction is the "cross-polarized component" of an electric field rotating counter-clockwise wherein the locus of the vector representing the electric field traverses an ellipse having the same ratio of major to minor axis but has the direction of the major axis in space quadrature with the previously mentioned major axis.

Referring to the block diagram of Fig. 1, the general scheme of the invention is that a relatively simple antenna means 19 later described, is combined with a phase shifting device 17 and hybrid junction 25 in such a manner that by a simple adjustment of the phase shifting device either linear, circular, or elliptical polarization patterns of one sense can be propagated and the cross-polarized component received at one of the hybrid terminal points $a'$ for example, and the transmitted polarization can be received at one of the other hybrid terminal points $b'$ for example.

The polarization characteristics of the propagated wave are determined not by the antenna itself, but by the design of the R.-F. circuit which couples both the transmitter 20 and the receivers 21 and 22 to the antenna 19. In transmission the transmitted power from transmitter 20 is divided into two equal parts in the hybrid junction 25. Half of the power proceeds through transmission means 13 from terminal point c' of device 25 to the phase shifting device 17, and thence to one part of the antenna. Half of the power also emerges from terminal d' and by means of transmission means 15 is carried to antenna 19 where the two halves are combined preferably in space quadrature as hereinafter described. (Other space relationships can be used for some purposes.) The antenna feed lines 13 and 15 must deliver these components in the proper time and space relationship so as to produce and receive the circular, elliptical, or linear polarization.

On reception, the hybrid junction 25 and the phase shifting device 17 permits both the transmitted polarization and its cross-polarized component to be received respectively at receivers 22 and 21 simultaneously. By means of switch device 31, the transmitter 20 can be connected to either terminal point a' or b' and, due to the function of the hybrid junction, the polarization of the propagated wave will be in one sense or another. That is, either horizontal or vertical polarization for one setting of the phase shifter, or right or left hand circular (or elliptical) polarization for another setting of the phase shifting device. For any one setting of the phase shifting device, the apparatus will both propagate one type of polarization and receive and discriminate between the transmitted polarization and its cross-polarized component simultaneously.

Figures 5a, 5b, 6a and 6b to which reference is now made, illustrate vectorially how the two radio frequency energy components carried respectively by the feed lines 13 and 15 are combined in space to produce the various types of polarization. Referring to Fig. 5a, vectors $a$ and $b$ are in space phase quadrature ($m$ equals 90 degrees) and vary in length respectively according to a function $k \cos Wt$ (W equals 2 times $f$ (frequency), and $t$ is time) and sine $(Wt+x)$. When $x$ is zero, the two vectors when vectorially added produce a resultant vector $l$ which is of constant magnitude and rotates through 360 degrees once every $1/f$ seconds. Here vectors $a$ and $b$ are both in time and space phase quadrature. If vector $l$ represented an electric field, it would represent a field having a right-hand circular polarization. When $x$ is some value between zero and plus or minus 90 degrees, vector $l$ changes length as it rotates and its tip follows an ellipse. With $l$ representing an electric field, it would be a right-hand elliptical polarization.

The cross-polarized component of the field represented by Fig. 5a, is shown in Fig. 5b. Here vector $b'$ is 180 degrees in space phase relation with vector $b$ in Fig. 5a. When $x$ is zero, vectors $b$ and $b'$ are in time phase (i. e. are maximum together in the direction shown) but, because of the space phase difference, vectors $a$ and $b'$ add to form a vector $l'$ which rotates counter-clockwise keeping a constant magnitude. This is a left hand circular polarization. When $x$ is zero, vectors $a$ and $b'$ are said to have a time phase relation of 90 degrees (likewise with vectors $a$ and $b$). So too, when $x$ is between zero and plus or minus 90 degrees, the tip of vector $l'$ follows an ellipse but it has its major axis at right angles to the major axis of the ellipse followed by vector $l$ in Fig. 5a.

Fig. 6 to which reference is now had, represents field vectors added to produce a linear polarization. In Fig. 6a, two vectors $f$ and $g$ are placed $m$ degrees in space phase. To produce linear polarization vectors $f$ and $g$ are in time phase (i. e. their magnitude varies as $k \cos Wt$). The two vectors add to form a vector $d$ which varies in length as a cosine function but does not rotate. If $d$ represented an electric field, it would be vertically polarized. If instead of vector $g$ a vector $h$ is added to $f$ which is 180 degrees out of space phase but in time phase (i. e. its length varies as $k \cos Wt$) with vector $g$ then vector $e$ results which varies in magnitude according to the function $\cos Wt$ but does not rotate. This is an example of a horizontal linear polarization if $e$ represented an electric field.

Fig. 6b represents a situation where the space phase (angle $m$) between the component vectors $f'$ and $g'$ and $f'$ and $h'$ is 90 degrees. These vectors respectively when added form vectors $d'$ and $e'$ which vary in magnitude with the component vectors. Thus to produce linear polarization the component vectors can be at any angle $m$ (or $m$ plus 180 degrees) with respect to each other and produce a linear polarization. Though a case where $m$ is different from 90 degrees has not been shown in Fig. 5, an elliptical polarization can be produced with two component vectors in time phase quadrature making some angle less than 90 space degrees with respect to each other. Circular polarization is not easily produced in this manner, however. Since it is desired to be able to produce all types of polarization with the apparatus forming this invention, the preferred form of the apparatus is constructed to produce component fields at 90 space degrees from each other. Then by varying the time phase between the component fields by means of the phase shifting device 17, any type of polarization can be produced.

It is to be noted, that from the explanation of Figs. 5 and 6 where component vectors were added to produce various types and senses of polarization, that, given any type of polarization, it can be broken down into component vectors of the type illustrated by Figs. 5 and 6. This is important when the use of the apparatus in receiving and discriminating between different senses of polarization is explained hereafter. The manner in which the component fields can be produced at right angles with respect to each other are varied. Fig. 4 shows one antenna arrangement which is applicable to the lower frequency range. There two dipoles 9 and 10 are orientated at right angles with respect to each other. Of course where angle $m$ is some other angle, say 45 degrees, then the two antennas are orientated at a 45 degree angle with respect to each other.

Fig. 9 shows the embodiment preferred at the higher frequencies when wave guides become the most efficient transmission means. Though rectangular or square wave guides are there shown, it is to be understood that many other shapes of wave guides could be used without deviating from the invention. The rectangular wave guide is the preferred shape when angle $m$ is 90 degrees, and also for the reason that undesirable modes are more easily avoided and the orientation of the electric field is more easily controlled.

The mode used with the wave guide should be the $TE_{01}$ mode. Here the electric field is parallel to the shorter dimension of the rectangular wave guide. A square wave guide 18 is made to communicate with the rectangular wave guide 15 so that one of its cross-sectional dimensions is parallel to the long dimension of the rectangular wave guide 15. (Whenever the term long or short dimension is used, it refers to the cross-sectional dimension along a right section of the wave guide.) This insures a proper relation between the electric field in the rectangular wave guide and the square wave guide 18. Thus, the electric field in wave guide 15, induces a field in guide 18 the direction of which in the square wave guide will be a maximum and parallel to the vertical sides of the square wave guide shown in Fig. 9. The other rectangular wave guide 13 which is to contribute the other orthogonal field component is made to communicate with wave guide 15 at the point just opposite the place where the square wave guide 18 joins the rectangular wave guide 15. As shown in Fig. 9, one of the smaller cross-sectional dimensions of wave guide 13 is parallel to the long dimension of wave guide 15 by joining wave guide 13 to wave guide 15 along the latter's wider side. This is a most satisfactory coupling method though the wave guide 13 could communicate with wave guide 15 along the latter's narrow side so that one of the shorter cross-sectional dimensions of both guides would be parallel. Or, wave guide 13 could be made to communicate directly with the square guide 18. The important thing is that the two rectangular wave guides 13 and 15 produce electric fields in the square wave guide at right angles (angle $m$ is 90 degrees) with respect to each other. If circular wave guides are used for the square wave guide 18 the angle $m$ can be made at any angle while the square wave guide 18 limits the angle $m$ to 90 degrees. This is not disadvantageous to the square wave guide because all of the desired polarizations can be obtained with the square wave guide (where angle $m$ is 90 degrees) more satisfactorily for reasons previously explained.

One of the most important aspects of the invention is the manner in which the receivers 21 and 22, and transmitter 20 are coupled to the antenna 19. (In Fig. 9 the square wave guide 18 and its flared horn is in effect the antenna.) This is accomplished through a hybrid junction 25 and the phase delay means 17.

Fig. 7 shows various forms of the hybrid junction. Hybrid junctions are well known in the art and consist generally of four terminal points. For low frequency networks using ordinary dipole radiators such as shown in Fig. 4, a junction similar to that shown in Fig. 7a may be used. Here each terminal point connects with a pair of leads (note the conductors 5—8 in Fig. 4) while in the higher frequency networks, where wave guides are used, the terminal points $a'$, $b'$, $c'$ and $d'$ connect to wave guides as in Fig. 7b. In a hybrid junction, when energy is fed to one of the terminal points $a'$, half of the energy emerges each from two other terminal points $c'$ and $d'$. Nothing emerges from $b'$. If energy is fed into terminal $b'$, half of the energy also emerges each from $c'$ and $d'$ but the phase of the energy coming from one of the terminal points $c'$ or $d'$ is 180 out of time phase from what it was when energy was fed to terminal point $a'$. No energy emerges from terminal point $a'$ in such a situation. For purposes of laying a foundation and definition of the terms used in the claims, terminal points $a'$ and $b'$ will be called a pair of symmetrical terminal points. Likewise terminals $c'$ and $d'$ will be called a pair of symmetrical terminal points since they react just like terminal points $a'$ and $b'$. That is, if energy is fed into terminal point $c'$, half of this energy emerges each from terminal points $a'$ and $b'$, and none from $d'$ and etc. In hybrid junctions, if equal amounts of energy are fed in time phase simultaneously to any pair of symmetrical terminal points, the sum total of two energies will emerge from only one of the other symmetrical terminal points. Nothing will emerge from the fourth terminal point. If the time phase of the energy fed to one of the terminal points is reversed 180 degrees, then the sum total of the two energies will emerge from the terminal point from which nothing emerged before. From what has been said, it is clear that in the latter situation no energy will emerge from the said other symmetrical terminal point.

Now referring to Figs. 2 and 3, an example of the preferred embodiment of the apparatus is shown, in diagrammatic form in part, to explain how the apparatus is used to transmit and receive right hand circular polarization. From this, the manner in which the other kinds of polarization are transmitted and received will be apparent from the previous explanatory matter.

In Fig. 2, a sine wave of voltage of high frequency having an amplitude of 1 unit is fed to junction point $a'$ of the hybrid junction 25 (or "Magic Tee" as it is often called). Due to the nature of the hybrid junction, as previously explained, one-half of the energy emerges each from junction points $c'$ and $d'$ and no energy emerges from junction point $b'$ to which a receiver 22 is attached. Since energy or power is proportional to the square of the voltage (i. e. electric field strength) the voltage or field emerging from junction points $c'$ and $d'$ is .7 of a unit and as shown by the arrows and polarity marks, are in time phase. If the voltage had been fed into junction point $b'$, then, from what has been previously stated, the time phase of the voltage emerging from junction point $c'$ would be 180 degrees out of time phase thereby producing a left hand circular polarization rather than a right hand polarization. The variable phase shifting device 17 is adjusted for a 90 degree delay if the transmission means 13 and 15 are of the same electrical length so that the voltage or field existing at space quadrature points 32 and 33 will be 90 degrees in time phase. Due to the space phase of the fields produced by transmission means 13 and 15 in the square wave guide 18, a right hand circular polarization will result. To produce a right hand elliptical polarization the phase shifter 17 is adjusted so that the voltages arriving at points 32 and 33 will be other than 90 degrees or zero time phase relation. If the time phase is zero a linear polarization will result in one direction. In the latter situation, if energy is fed into junction point $b'$, then a linear polarization will result in the square wave guide in a direction at right angles to the last-mentioned direction.

In Fig. 3, a right hand polarization is being received. Due to the square wave guide, the rotating field is broken down into two orthogonal components automatically and therefore two voltages or fields exist at points 32 and 33 which are in space and time quadrature and are represented by vectors $a$ and $b$ in Fig. 5a. The phase shifter 17 which was set to delay the voltage or field 90 degrees during transmission also delays the received field or voltage component 90 degrees in time phase so that the voltage arriving at the $c'$ and $d'$ terminal points are in time phase. The received wave therefore passes out terminal point $a'$ to a receiver 21. (See Fig. 2.) For left hand polarization one of the field components is 180 space degrees out of phase with that shown in Fig. 2 at points 32 or 33, so that the 90 degree phase delay will cause the voltages or fields at terminal points $c'$ and $d'$ to be 180 time degrees out of phase. (It is to be noted in Figs. 5–6, that a vector which is 180 degree space phase from $b$ is identical with a vector which is 180 time degrees from vector $b$.) This left hand polarized wave will be received only on receiver 22 therefore. The operation of the circuit is similar for the case of linear or elliptical polarization since the component vectors received when reaching terminal $c'$ and $d'$ are either in or out of phase depending on the sense of the polarization so that discrimination takes place and receivers 21 and 22 will only receive one sense of polarization.

When linear polarization is being received, in order for the device to properly discriminate, it is necessary to orientate the square wave guide 18 so that the received polarization will be parallel to a line which will bisect the angles of the square. Fig. 8 shows such an orientation for vertical or horizontal linear polarization. If a circular wave guide were used, it too must be so orientated that the field components which are to be set up in transmission means 13 and 15 are at 45 degrees to the direction of the received linear polarization if angle $m$ is 90 degrees.

The particular phase delay means used is not a critical element of this invention and so various well known types of devices can be used.

It may be desirable to use a reflector with the embodiment of Fig. 9. It was feared that, if the antenna design consisted of a symmetrical paraboloid illuminated by the horn feed, the polarization of the radiated field would be disturbed by two effects, namely, the interaction between the feed and the reflector and the blocking of the paraboloidal aperture by the feed and feed line. It was found upon experimental investigation that a symmetrical paraboloid could be used because it is possible to control the phase and amplitude of each component separately in the feed line and thus to compensate for the effects of the interaction between the feed and reflector. Fig. 10 shows a paraboloid reflector 26 being fed from a square wave guide 18.

Asymmetrically cut reflectors and horn feeds with and without focusing lenses can also be used.

It is important to note that the transmission lines 13 and 15 must be terminated in their characteristic impedance to prevent reflections. Any reflections will prevent the hybrid junction from properly discriminating between the various polarizations. The flare of the horn 28 and adjusting means 29 (e. g. a starting plunger) regulate the characteristic impedance terminations of the wave guide transmission means 13 and 15 in Fig. 9.

The present invention has a more general application for isolating the receiver from the transmitter. In circular or elliptical polarization an electromagnetic wave having an electric field rotating in one direction when striking an object is converted into its cross-polarized component of an electromagnetic wave which has an electric field rotating in the opposite direction. Referring to Figure 1, this fact makes it possible to feed energy to terminal $a'$ of hybrid 25 junction and have all of the energy transmitted by antenna 19 with none getting to receiver 22. From what has been previously said, it should be apparent that the echo wave being the cross-polarized component of the transmitted wave will be received only by receiver 22. For this application receiver 21 would not be necessary. The isolation of the receiver and transmitter in this manner is not possible with linear polarization because the reflected wave of a horizontally polarized wave is not usually a vertically polarized wave.

For purposes of laying a foundation for the claims, the term "antenna connecting terminal" is a generic expression which includes antenna connecting points 32—33, or 34—35 (in Fig. 4) and also the point at which each wave guide communicates with square wave guide 18.

It is to be understood that many variations may be made from the embodiments above described without deviating from the spirit of the invention.

The invention described herein may be manufactured and used by or for the Government of the United States of America for governmental purposes without the payment of any royalties thereon or therefor.

What is claimed is:

1. Apparatus for simultaneously receiving and discriminating between electromagnetic waves having two different types of electric field polarization, one type being the cross polarized component of the other, and each of which can be broken down into a first and second component field vectors disposed in a predetermined space phase relation, antenna means having two connecting terminals capable of establishing an electric field in a first given direction, which is parallel to one of said first component field vectors, when energy is fed only to a first connecting terminal, and also capable of establishing an electric field in a second given direction, which is parallel to one of the said second component field vectors, when energy is fed only to a second connecting terminal, a hybrid junction comprising a first and second pair of symmetrical terminal points, said first antenna connecting terminal connected to one of the terminal points of the said first pair of symmetrical terminal points, means including an adjustable phase displacement means connecting the second antenna terminal to the other terminal point of said first pair of symmetrical terminal points, said adjustable phase displacement means being adjusted so that the voltages set up by the component field vectors from one type of polarized field at said first pair of symmetrical terminal points will be 180 degrees out of time phase with each other, thereby causing the voltage set up by the component of electric field represented by the other type of polarized field to be in time phase with each other at the first pair of symmetrical junction points, at least one of the other pair of symmetrical terminal points to be connected to a device responsive to the desired type of polarization.

2. Apparatus for propagating electro-magnetic waves having one type of polarization and receiving both the transmitted polarization and its cross-polarized component comprising a hybrid junction including a first and second pair of symmetrical terminal points, an electro-magnetic energy source and a first device which is to be responsive to energy originating from a received electro-magnetic wave of one sense of polarization, connected to one of the terminal points of the said first pair of symmetrical terminal points, a second device which is to be responsive to energy originating from an electro-magnetic wave which is the cross-polarized component of the last named electro-magnetic wave connected to the other terminal point of the said first pair of symmetrical terminal points, antenna means having first and second input terminals capable of establishing an electric field in a first given direction when energy is fed to said first antenna input terminal, and capable of establishing an electric field in a second given direction which is at right angles to said first given direction when energy is fed to said second antenna input terminal, said first antenna input terminal coupled to one of the terminal points of said second pair of symmetrical terminal points, an adjustable phase shifting means coupled between the other terminal point of said second pair of symmetrical terminal points and said second antenna input terminal, said adjustable phase shifting means being adjusted so that the time phase relation of the energy reaching said first and second antenna input terminals will be such as to transmit the desired type of polarization thereby enabling the apparatus to receive the transmitted polarization and its cross-polarized component.

3. Apparatus for simultaneously receiving and discriminating between electro-magnetic waves having two different types of electric field polarization, one type being the cross-polarized component of the other, and each of which can be broken down into first and second component field vectors disposed in a predetermined space phase relation, a first wave guide which is of such cross-sectional shape that it will be excited to a maximum degree by a first electric field extending in a first given direction which is parallel to said first component field vector, and also by a second electric field which is in a second given direction which is parallel to said second component field vector, a first transmission means coupled to said first wave guide so that it is excitable to a maximum degree by said first electric field when it is present in said wave guide, a second transmission means also coupled to said first wave guide which is excitable to a maximum degree by said second electric field when it is present in said first wave guide, a hybrid junction including a first and second pair of symmetrical terminal points, said first and second transmission means each coupled to a different terminal point of said first pair of symmetrical terminal points, one of said transmission means including a time phase displacement means, said time phase displacement means being adjusted so that the time phase relation of the voltages set up by the component field vectors from one type of polarized field at said first pair of symmetrical terminal points will be 180 time degrees out of phase with each other, one of said second pair of symmetrical terminal points connected to a device which is to be responsive to the desired type of polarization.

4. Apparatus for propagating electro-magnetic waves having one type of polarization and receiving both the transmitted polarization and its cross-polarized component comprising a hybrid junction including a first and second pair of symmetrical terminal points, an electromagnetic energy source and a first device which is to be responsive to energy originating from a received electromagnetic wave of one sense of polarization connected to one of the terminal points of the said first pair of symmetrical terminal points, a second device which is to be responsive to energy originating from an electromagnetic wave which is the cross-polarized component of the last named electromagnetic wave connected to the other terminal point of the said first pair of symmetrical terminal points, a first wave guide which is of such cross-sectional shape that it will be excited to a maximum degree by a first electric field extending in a first given direction, and also by a second electric field which is at right angles to said first electric field, a first transmission means coupled to said first wave guide so that it is excitable to a maximum degree by said first electric field when it is present in said wave guide, a second transmission means also coupled to said first wave guide which is excitable to a maximum degree by said second electric field when it is present in said first wave guide, said first and second transmission means each coupled to a different terminal point of said second pair of symmetrical terminal points, one of said transmission means including a time phase displacement means, said time phase displacement means being adjusted so that the time phase relation of the voltages set up by the component field vectors from one type of polarized field at said first pair of symmetrical terminal points will be 180 time degrees out of phase with each other.

5. Apparatus for simultaneously receiving and discriminating between electromagnetic waves having two different types of electric field polarization, one type being the cross-polarized component of the other, and each of which can be broken down into first and second component field vectors disposed in a predetermined space phase relation, a first wave guide which is of such cross-sectional shape that it will be excited to a maximum degree by a first electric field extending in a first given direction which is parallel to said first component field vector, and also by a second electric field which is in a second given direction which is parallel to said second component field vector, a first transmission means coupled to said first wave guide so that it is excitable to a maximum degree by said first electric field when it is present in said wave guide, a second transmission means also coupled to said first wave guide which is excitable to a maximum degree by said second electric field when it is present in said first wave guide, a hybrid junction including a first and second pair of symmertical terminal points, said first and second transmission means each coupled to a different terminal point of said first pair of symmetrical terminal points, one of said transmission means including a time phase displacement means, said time phase displacement means being adjusted so that the time phase relation of the voltages set up by the component field vectors from one type of polarized field at said first pair of symmetrical terminal points will be 180 time degrees out of phase with each other, one of said second pair of symmetrical terminal points to be connected to a device which is to be responsive to the desired type of polarization, said first and second transmission means terminated by their characteristic impedance so that no reflections occur.

6. Apparatus for propagating electromagnetic waves having one type of polarization and receiving both the transmitted polarization and its cross-polarized component comprising a hybrid junction including a first and second pair of symmetrical terminal points, an electromagnetic energy source and a first device which is to be responsive to energy originating from a received electromagnetic wave of one sense of polarization, connected to one of the terminal points of the said first pair of symmetrical terminal points, a second device which is to be responsive to energy originating from an electromagnetic wave which is the cross-polarized component of the last named electromagnetic wave connected to the other terminal point of the said first pair of symmetrical terminal points, a first wave guide which is of such cross-sectional shape that it will be excited to a maximum degree by a first electric field extending in a first given direction, and also by a second electric field which is at right angles to said first electric field, a first transmission means coupled to said first wave guide so that it is excitable to a maximum degree by said first electric field when it is present in said wave guide, a second transmission means also coupled to said first wave guide which is excitable to a maximum degree by said second electric field when it is present in said first wave guide, said first and second transmission means each coupled to a different point of said second pair of symmetrical terminal points, one of said transmission means including a time phase displacement means, said time phase displacement means being adjusted so that the time phase relation of the voltages set up by the component field vectors from one type of polarized field at said first pair of symmetrical terminal points will by 180 time degrees out of phase with each other, said first and second transmission means terminated by their characteristic impedance so that no reflections occur.

7. Apparatus for simultaneously receiving and discriminating between electromagnetic waves having two different types of electric field polarization, one type being the cross-polarized component of the other, and each of which can be broken down into a first and second component field vectors disposed in a predetermined space phase relation, a first wave guide directed toward a parabolic reflector and which is of such cross-sectional shape that it will be excited to a maximum degree by a first electric field extending in a first given direction which is parallel to said first component field vector, and also by a second electric field which is in a second given direction which is parallel to said second component field vector, a first transmission means coupled to said first wave guide so that it is excitable to a maximum degree by said first electric field when it is present in said wave guide, a second transmission means also coupled to said first wave guide which is excitable to a maximum degree by said second electric field when it is present in said first wave guide, a hybrid junction including a first and second pair of symmetrical terminal points, said first and second transmission means each coupled to a different terminal point of said first pair of symmetrical terminal points, one of said transmission means including a time phase displacement means, said time phase displacement means being adjusted so that the time phase relation of the voltage set up by the component field vectors from one type of polarized field at said first pair of symmetrical terminal points will be 180 time degrees out of phase with each other, one of said second pair of symmetrical terminal points connected to a device which is to respond to the desired type of polarization.

8. Apparatus for propagating electromagnetic waves having one type of polarization and receiving both the transmitted polarization and its cross-polarized component comprising a hybrid junction including a first and second pair of symmetrical terminal points, and electromagnetic energy source and a first device which is to be responsive to energy originating from a received electromagnetic wave of one sense of polarization, connected to one of the terminal points of the said first pair of symmetrical terminal points, a second device which is to be responsive to energy originating from an electromagnetic wave which is the cross-polarized component of the last named electromagnetic wave connected to the other terminal point of the said first pair of symmetrical terminal points, a first wave guide directed toward a parabolic reflector and which is of such cross-sectional shape that it will be excited to a maximum degree by a first electric field extending in a first given direction, and also by a second electric field which is at right angles to said first electric field, a first transmission means coupled to said first wave guide so that it is excitable to a maximum degree by said first electric field when it is present in said wave guide, a second transmission means also coupled to said first wave guide which is excitable to a maximum degree by said second electric field when it is present in said first wave guide, said first and second transmission means each coupled to a different junction point of said second pair of symmetrical terminal points, one of said transmission means including a time phase displacement means, said time phase displacement means being adjusted so that the time phase relation of the voltage set up by the component field vectors from one type of polarized field at said first pair of symmetrical terminal points will be 180 time degrees out of phase with each other.

9. Apparatus for simultaneously receiving and discriminating between two types of linear polarized electromagnetic wave extending respectively in a first and second given direction which are 90 space degrees apart, comprising antenna means having two connecting terminals which are capable of establishing an electric field in a third direction, when radio frequency energy is fed only to a first antenna connecting terminal, and capable of propagating an electric field in a fourth direction which is $m$ degrees from said third direction when energy is fed only to a second connecting terminal, means for mounting said antenna means so that said third direction is $m/2$ space degrees from the said first given direction, a hybrid junction comprising a first and second pair of symmetrical terminal points, said first antenna connecting terminal connected to one of the terminal points of the said first pair of symmetrical terminal points, an adjustable phase displacement means connected to the said second antenna connecting terminal, means for connecting said adjustable phase displacement means with the other junction point of said first pair of symmetrical junction points, said phase displacement means being adjusted so that the voltage set up by the one type of polarized field at said first pair of symmetrical terminal points will be 180 degrees out of time phase with each other, thereby causing the voltage set up by the component of electric field represented by the other type of polarized field to be in time phase with each other at the first pair of symmetrical terminal points, one of the other pair of symmetrical terminal points to be connected to a device which is to be responsive to the desired type of polarization.

10. Apparatus for propagating electromagnetic waves having one type of polarization and receiving both the transmitted polarization and its cross-polarized component comprising a hybrid junction including a first and second pair of symmetrical terminal points, an electromagnetic energy source and a first device which is to be responsive to energy originating from a received electromagnetic wave of one sense of polarization, connected to one of the terminal points of the said first pair of symmetrical terminal points, a second device which is to be responsive to energy originating from an electromagnetic wave which is the cross-polarized component of the last named electromagnetic wave, connected to the other terminal point of the said first pair of symmetrical terminal points, a first rectangular wave guide, a second rectangular wave guide communicating with said first wave guide so that one of its shorter cross-sectional dimension is parallel to the long dimension of said first wave guide, a square wave guide communicating with said first wave guide opposite the portion of said first wave guide which communicates with said second wave guide, said square wave guide having one of its sides parallel to the long dimension of said first wave guide, said first and second wave guides each coupling to a different terminal point of said first pair of symmetrical terminal points, one of said two last-named wave guides including a phase displacement means, said phase displacement means being adjusted so that the voltage set up by the orthogonal field components of the electromagnetic wave of one type of polarization will be 180 time degrees out of time phase with each other at said first pair of symmetrical terminal points.

11. Apparatus for transmitting an electromagnetic wave of one type of polarization and receiving both this type and also the cross-polarized component of the transmitted field polarization, wherein each type can be broken down into a first and second component field vectors disposed in a predetermined space relation, antenna means having two connecting terminals and capable of propagating an electric field in a first given direction, which is parallel to said first component field vector, when energy is fed only to a first connecting terminal, and also capable of propagating an electric field in a second direction which is parallel to said second component field vector, when energy is fed only to a second connecting terminal, a hybrid junction comprising a first and second pair of symmetrical terminal points, said first antenna connecting terminal connected to one of the terminal points of the said first pair of symmetrical terminal points, an adjustable phase displacement means connected to the said second antenna connecting terminal, means for connecting said adjustable phase displacement means with the other terminal point of said first pair of symmetrical terminal points, said adjustable phase displacement means being adjusted so that the voltage set up by the component field vectors from one type of polarized field, at said first pair of symmetrical terminal points will be 180 degrees out of time phase with each other, an electromagnetic energy source and a first device which is to be responsive to energy originating from a receiver electromagnetic wave of one sense of polarization, connected to one of the terminal points of the said first pair of symmetrical terminal points, a second device which is to be responsive to energy originating from an electromagnetic wave which is the cross-polarized component of the last named electromagnetic wave, connected to the other terminal point of the said first pair of symmetrical terminal points.

12. Apparatus for transmitting one type of polarization and receiving its cross-polarized component comprising the combination of a hybrid junction including a first and second pair of symmetrical terminal points, a sine wave voltage source connected to one of the terminal points of the said first pair of symmetrical terminal points, a second device which is to be responsive to energy originating from an electromagnetic wave which is the cross-polarized component of the last named electromagnetic wave connected to the other terminal point of the said first pair of symmetrical terminal points, antenna means having a first and second input terminals capable of establishing an electric field in a first given direction when energy is fed to said first antenna input terminal, and capable of establishing an electric field in a second given direction which is at right angles to said first given direction when energy is fed to said second antenna input terminal, said first antenna input terminal coupled to one of the terminal points of said second pair of symmetrical terminal points, phase shift means coupled between the other terminal point of said second pair of symmetrical terminal points and said second antenna input terminal, said phase shift means being adjusted so that the time phase relation of the energy reaching said first and second antenna input terminals will be such as to transmit the desired type of polarization.

13. Apparatus for receiving different types of polarized electromagnetic radiation comprising the combination of a hybrid junction including a first and second pair of symmetrical terminal points, a pair of receiving means each coupled to a corresponding one of said first pair of symmetrical terminal points, antenna means having first and second input terminals capable of establishing an electric field in a first given plane when energy is fed to said first input terminal and further capable of establishing an electric field in a second given plane at right angles to asid first plane when energy is fed to said second antenna terminal, means coupling one of said antenna terminals to one of the second pair of symmetrical terminal points of said junction, and a phase shift device coupling the second of said antenna terminals to the other of said second pair of symmetrical terminal points.

14. The apparatus defined in claim 13 wherein said phase shifting device is adjusted to provide a 90° phase shift in the energy propagated therethrough.

HERMAN N. CHAIT.

REFERENCES CITED

The following references are of record in the file of this patent:

UNITED STATES PATENTS

| Number | Name | Date |
|---|---|---|
| 1,958,886 | Chubb | May 15, 1934 |
| 2,312,093 | Hammond, Jr. | Feb. 23, 1943 |
| 2,357,439 | Usselman | Sept. 5, 1944 |
| 2,436,828 | Ring | Mar. 2, 1948 |
| 2,441,574 | Jaynes | May 18, 1948 |
| 2,445,896 | Tyrrell | July 27, 1948 |
| 2,530,818 | Fox | Nov. 21, 1950 |